June 30, 1959  A. D. HERRING ET AL  2,892,486
ADJUSTABLE SEAT
Filed April 4, 1957  3 Sheets-Sheet 1
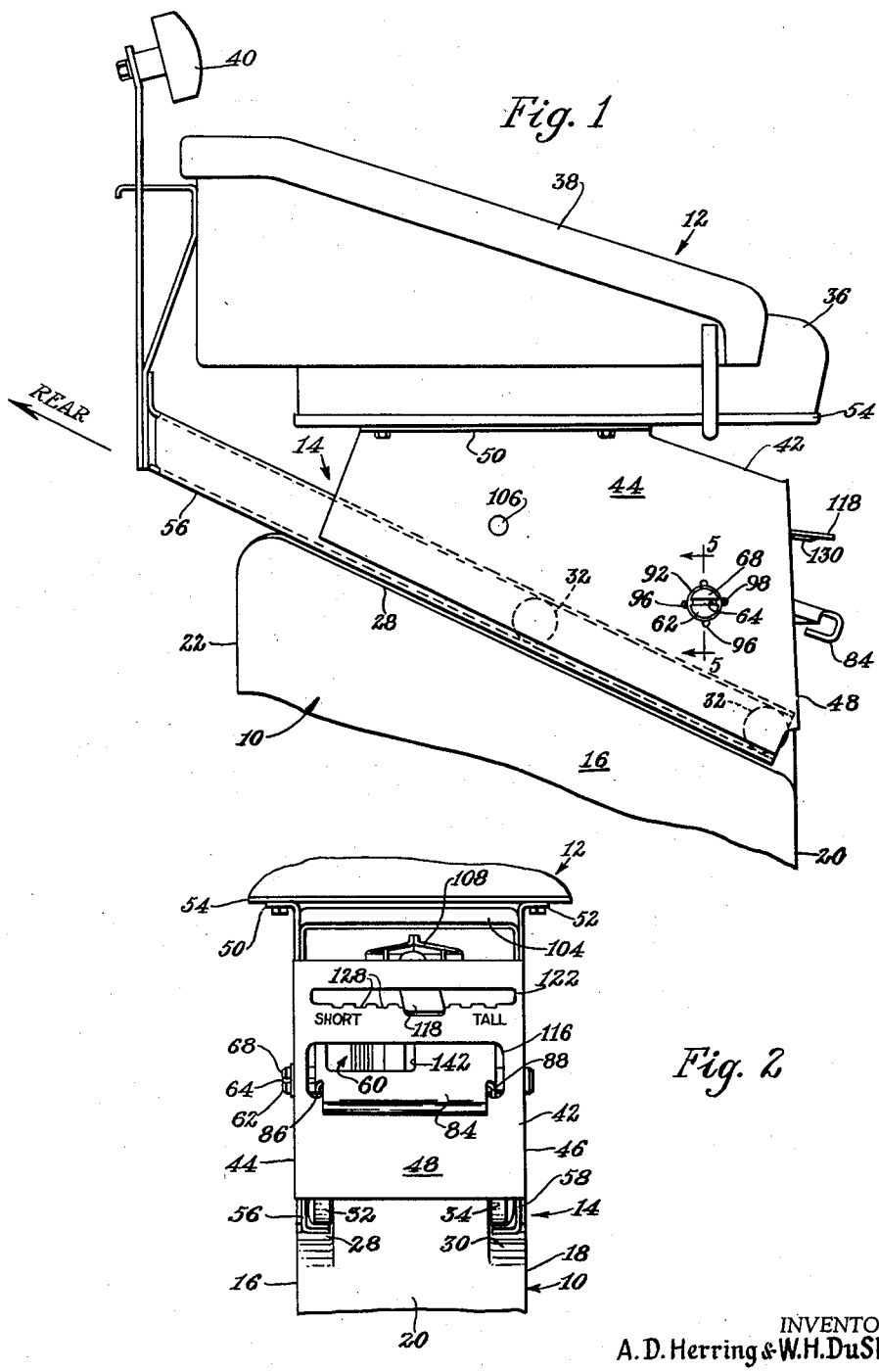
INVENTORS
A.D. Herring & W.H. DuShane INVENTORS
A.D. Herring & W.H. DuShane June 30, 1959   A. D. HERRING ET AL   2,892,486
ADJUSTABLE SEAT
Filed April 4, 1957   3 Sheets-Sheet 3
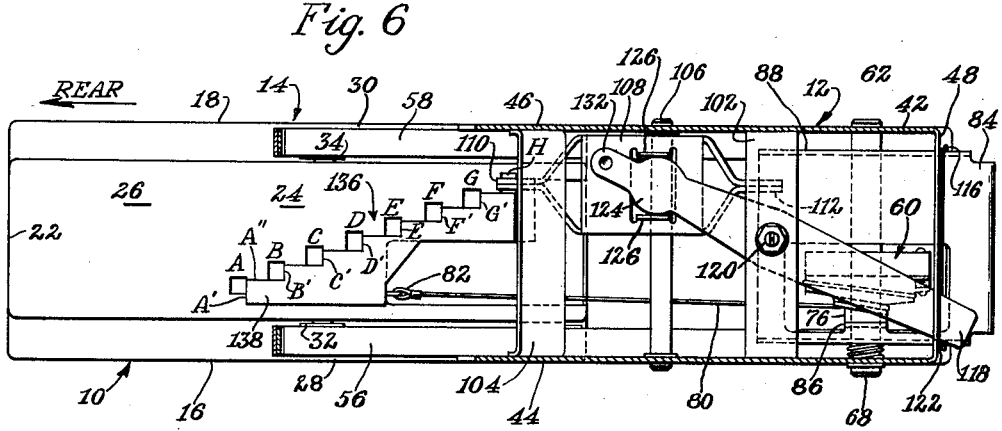
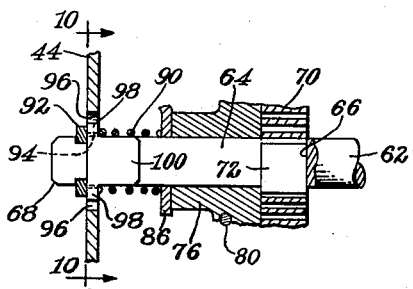
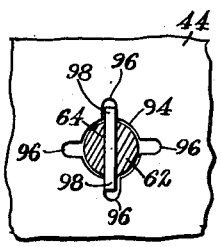
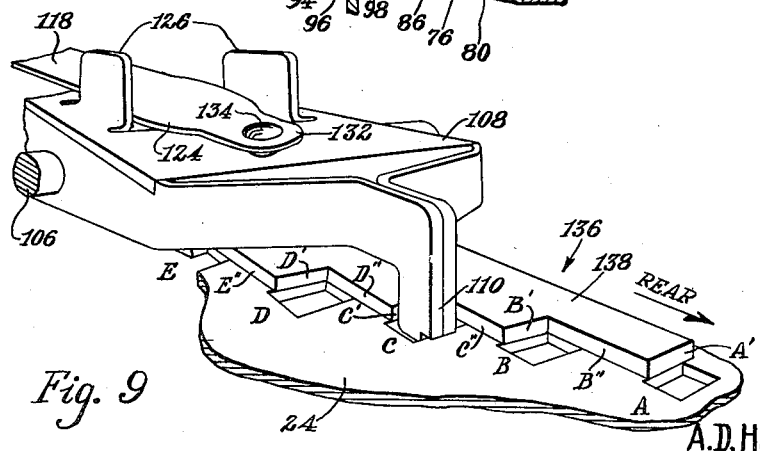
INVENTORS
A.D. Herring & W.H. DuShane

United States Patent Office 2,892,486
Patented June 30, 1959

2,892,486

ADJUSTABLE SEAT

Ardis D. Herring and Wallace H. Du Shane, Waterloo, Iowa, assignors, by mesne assignments, to Deere & Company, a corporation of Delaware Application April 4, 1957, Serial No. 650,608

19 Claims. (Cl. 155—115)

This invention relates to an adjustable seat and more particularly to a seat structure for a tractor or similar vehicle in which it is desirable at times that the seat be displaced temporarily from a normal position and returnable to that position without upsetting the position-determining means.

In a typical arrangement in which a seat of the general character referred to is mounted on a tractor, the seat is provided with adjustable means for selecting a position most suited to the operator while seated, with provision being made, of course, to change the selection to position the seat according to the desires of an operator of different stature. In the conventional seat, release of the latch for displacement of the seat normally involves the requirement that the latch be reset so that the original position may again be obtained. This requirement is not so much a nuisance in instances in which displacement of the seat is infrequent, but in a tractor, for example, the operator often desires to stand and therefore prefers that the seat be rearwardly displaced so as to give him more standing room. When he returns to his seated position, he prefers that the seat automatically return to its original position. The present invention pertains to improvements in a seat of this character, and the primary object thereof is to provide seat latch control means including a pair of selectors, one of which will release the latch for rearward displacement of the seat without upsetting the selected position of the latch, the other selector being used to modify the position of the latch for selecting a new position when desired. Further objects of the invention reside in directing that control means along a design incorporating relatively fool proof selector means, improved means for biasing the seat for rearward displacement when the latch is released, improved adjusting means for the biasing means, and such other features and objects as will appear from the following detailed description of a preferred embodiment of the invention as illustrated in the accompanying sheets of drawings, the several figures of which are described immediately below.

Fig. 1 is a side elevation of a seat embodying the invention.

Fig. 2 is a fragmentary front elevation of the same.

Fig. 6 is a plan view, partly in section, as seen generally along the line 6—6 of Fig. 4.

Fig. 7 is an enlarged fragmentary section on the line 7—7 of Fig. 5.

Fig. 8 is a view similar to Fig. 7 but showing a different position of the releasable component.

Fig. 9 is an enlarged fragmentary perspective depicting the functioning of the settable and releasable seat latch.

Fig. 10 is a section on the line 10—10 of Fig. 7.

Figure 3:
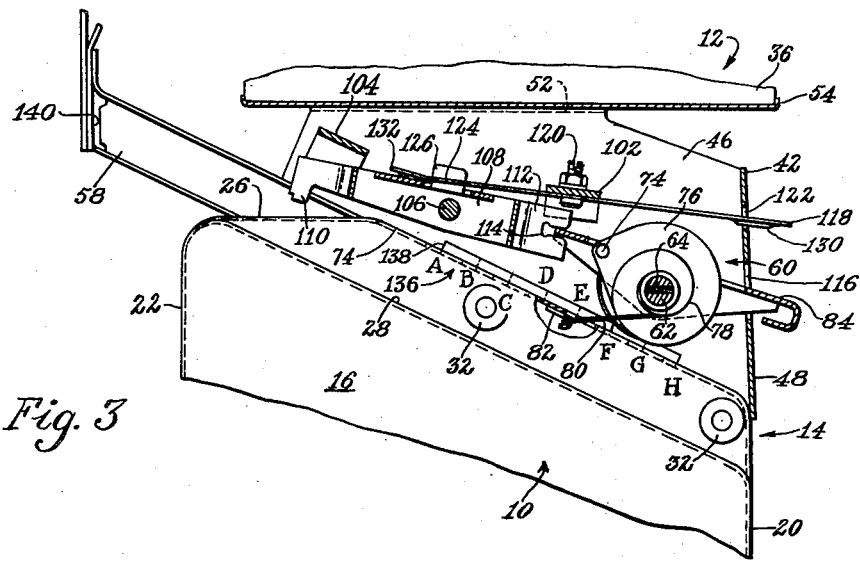
Fig. 3 is a longitudinal section showing the seat in its extreme rear position.

The seat structure comprises a seat support element 10, a seat 12 and mounting means 14 mounting the seat on the support for fore-and-aft movement of the seat relative to the support. As indicated, the means 14 is inclined upwardly and rearwardly so that fore-and-aft movement of the seat changes elevation of the seat between an extreme forward downhill position and an extreme rear uphill position, these positions being illustrated respectively in Figs. 4 and 3.

The support 10 is here illustrated as being of boxlike nature, having opposite sides 16 and 18, front and rear ends 20 and 22 and a top including an inclined front portion 24 and a horizontal rearward portion 26, in which respect it should be noted that the portion 26 need not be horizontal as long as it is at a downward angle relative to the inclined portion 24, the purpose of which will presently appear. The seat support sides 16 and 18 are respectively inwardly offset to afford fore-and-aft uphill track elements 28 and 30 (Figs. 2 and 6), which track elements constitute the means 14 as a track means of which the elements just described flank the top 24—26, these elements being sloped according to the uphill and downhill path of travel of the seat between its front and rear positions. The track element 28 includes a pair of rollers 32 spaced apart fore-and-aft and a similar pair of rollers completes the track element 30. One of this second pair of rollers is visible at 34 in each of Figs. 2 and 6.

The seat 12 includes a typical seat cushion 36, arm rests 38 and a back rest 40, all appropriately grouped and supported on a seat mount 42 of box-like construction having opposite depending side walls 44 and 46 and a transverse front wall 48. The side walls are respectively flanged at 50 and 52 and are secured to a seat pan 54 which carries the cushion 36. The lower marginal portions of the seat side walls 44 and 46 are provided respectively with fore-and-aft channels 56 and 58 which respectively receive and ride on the rollers 32 and 34, thus completing the mounting means 14 by means of which the seat is carried for fore-and-aft and uphill and downhill movement as previously described.

Figure 4:
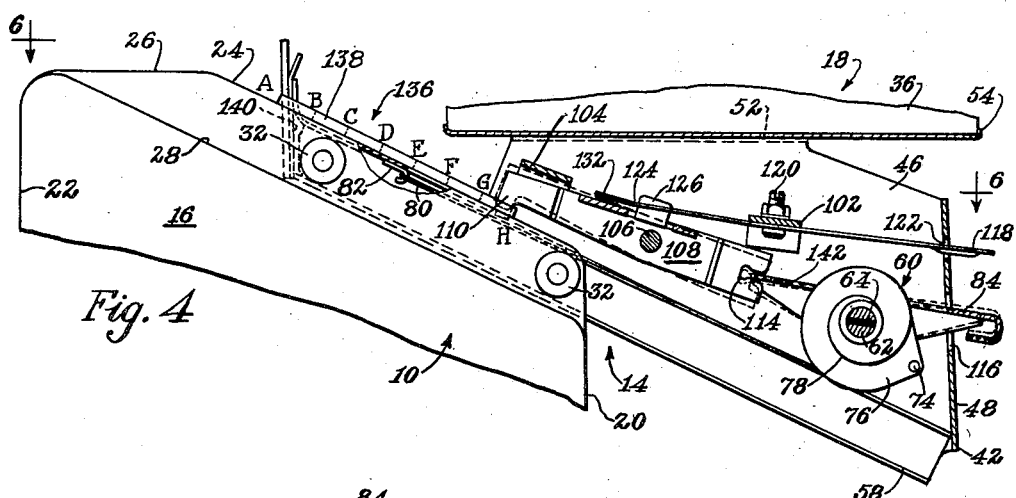
Fig. 4 is a similar view showing the seat in its extreme forward position.
Figure 5:
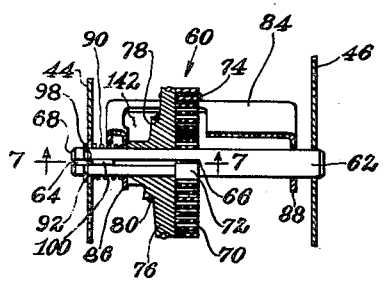
Fig. 5 is a section on the line 5—5 of Fig. 1.

As previously pointed out, Fig. 4 shows the extreme forward or downhill position of the seat, which is particularly suitable for an operator of short stature. Since the standing room on a tractor or argicultural machine operating platform is relatively limited, it will be readily appreciated that the seat in the extreme forward position is actually in the way of a standing operator, since the backs of the operators legs or thighs will contact the seat in the Fig. 4 position. In order that the seat may be temporarily removed as an obstacle, it may be rearwardly displaced via the track means 14 to occupy the extreme rear position as shown in Fig. 3, thus bringing the seat back to a position in which the front wall 48 thereof is substantially flush with the front end 20 of the support 10. Substantially automatic or semi-automatic rearward displacement of the seat is effected by biasing means 60, operative to cause the seat to move rearwardly to its extreme rear or uphill position when released by latch means to be presently described. The biasing means, in its present form, comprises a transverse shaft 62 supported at opposite ends by mounting members comprising the previously described seat side walls 44 and 46 (Fig. 5). This shaft has an axially extending diametrical slot 64 terminating at its inner end at 66 substantially midway between opposite ends of the shaft and opening at one end of the shaft at what may be termed an outer end as designated by the numeral 68. A torsion spring 70 has one end portion 72 received in the inner portion of the slot 64 and is wrapped around the shaft and has its outer end connected at 74 to the peripheral portion of a hub or drum 76 mounted adjacent to the spring. This hub has a spiral cable-receiving groove 78 about which a cable 80 is wrapped. The rear end of the cable is anchored at 82 (Figs. 4 and 6) to a rearward under portion of the seat support top 24, and the drum end of the cable is appropriately anchored to the drum at the smallest diameter portion of the spiral groove 78. This construction provides a typical constant-load biasing means producing a constant force regardless of the amount of cable wound on the drum 76.

The shaft 62, in addition to mounting the torsion means 60, mounts a first latch selector means 84 comprising a fore-and-aft lever of inverted U-shaped section having opposite depending legs 86 and 88 which are apertured in alinement to pivotally mount the selector means 84 on the shaft 62 (Fig. 5). The leg 86 abuts the proximate side of the torsion means hub or drum 76 and is itself spaced inwardly from the proximate seat side wall 44. A coiled compression spring 90 is interposed between the wall 44 and the selector leg 86, forcing the assembly 60 to the right as seen in Fig. 5. Since the inner portion 72 of the torsion spring 70 engages the inner end 66 of the slot, the assembly is limited in its rightward movement. The assembly, including the shaft 62, is prevented from movement to the right beyond the position shown in Fig. 5 by retaining means comprising a snap ring 92 which encircles the outer end portion 68 of the shaft 62 and which abuts the wall 44 from the outside. The wall 44 comprises a mounting member which receives the end portion 68 of the shaft 62 and for that purpose has a circular opening 94 sufficiently large to journal the outer end portion of the shaft 62. The opening 64 is circular except that it is interrupted, here at 90 degree intervals, by notches 96 which are radial to the opening and which afford notch means for receiving diametrically opposed lug portions 98 on a key 100 that is axially slidably received in the shaft slot 64. The diametrical dimension of the key 100 is substantially equal to that of the shaft 62 so that it, like the shaft 62, is encircled by the coiled compression spring 90 which, as previously described, acts between the selector means leg 86 and the seat side wall 44. At the same time, because of the configuration of the lugs 98, the spring also abuts these lugs and urges the key outwardly to the position of Fig. 7, in which position it is, of course, stopped by the snap ring 92. Thus, the key cannot be ejected completely from the slot. However, the key can be moved axially inwardly against the spring 90 by means of a screw driver or similar tool as shown in Fig. 8, thus disengaging the key lugs 98 from the opening notch means 96, whereby the shaft 62 may be forcibly turned to adjust the load on the torsion spring 70. As will be seen, the same screw driver, or similar tool, that is used to depress the key 100, is also useful as means for turning the shaft, since the blade of the screw driver or other tool is simultaneously received by the outer end portion of the shaft slot 64. After appropriate tension is secured on the torsion spring, the key may be released for outward movement to its outer position in which the lugs 98 engage a diametrically opposed pair of notch means 96.

The side walls 44 and 46 of the seat mount 42 are cross connected by front and rear cross members 102 and 104 respectively. A pivot means in the form of a transverse shaft 106 extends between the seat mount side walls intermediate the supports 102 and 104 and carries a latch 108 for rocking about the axis of the shaft and for lateral shifting axially of the shaft or transverse to the fore-and-aft extent of the seat support top 24. The rear portion of the latch 108 has a depending tongue 110 which is cooperative with means to be hereinafter described on the seat support top 24, the latch extending rearwardly from the shaft 106 as a rear arm to carry this tongue. The latch extends forwardly from the shaft 106 as a forward arm 112 which is notched or recessed at 114 to receive the rear portion of the selector means 84. Thus, rocking of the selector means about the shaft 62 will cause rocking of the latch 110. The front wall 48 of the seat mount is appropriately apertured at 116 to accommodate the forward portion of the latch 84, which is thus disposed in a convenient position for manipulation by the seated operator.

In addition to rackability of the latch 108 on the mounting shaft 106, it also has slidability; that is to say, the latch is shiftable laterally among a plurality of lateral positions. For this purpose, the structure includes second selector means in the form of a lever 118 pivoted on an upright axis at 120 to the front cross bar or member 102, the forward portion of the lever projecting through an aperture 122 in the front wall 48 of the seat and the rear portion of the lever having an integral disk-like portion 124 received between a pair of upturned ears 126 on the latch. As will be subsequently brought out, the selector means 118 selects positions of the seat according to the desire of the operator which in turn is dictated by the operator's stature. As best shown in Fig. 2, the aperture 122, through which the selector lever 118 extends forwardly, is notched at 128 to selectively receive a lug or dimple 130 on the underside of the front portion of the lever. As indicated, the opposite ends of the slit-like opening 122 are designated respectively "Short" and "Tall," which is indicative of the positions of the seat respectively for short and tall operators. Operators of medium height will be accommodated by selector positions intermediate the "Short" and "Tall" extreme positions.

The selector 118 is of resilient material, preferably sheet metal with sufficient spring characteristics, to serve as biasing means for depressing the rear portion of the latch 108. For this purpose, the lever is extended rearwardly at 132 and is dimpled at 134 to engage the rear part of the latch 108 (Fig. 9). Additionally, the resilient character of the lever 118 enables it to be deflected upwardly for release of the detent or dimple 130 from its presently engaged notch 128 in the selector aperture 122.

Selective control of the latch 108 by the selector means 84 and 118 is cooperative with stop or control means identified in its entirety by the numeral 136 and best shown in Figs. 6 and 9.

This means is effected in part by the provision in the seat support top 24 of a plurality of apertures or notches, here identified as to position by the use of the letters A through H. These apertures are arranged in a series extending diagonally to the fore-and-aft path traveled by the seat as it moves forwardly and rearwardly. Stated otherwise, the notches and cooperative stops afforded thereby are offset both fore-and-aft and laterally and thus extend not only through a fore-and-aft range but also through a lateral range. It is with respect to the latter that that lateral shifting of the latch 108 by the selector means 118 is significant, because adjustment of this nature determines which of the apertures will receive the tongue 110 on the latch 108. As a further part of the means 136, there is provided a plate 138 which is stepped as shown to afford front and side abutments for each position, except that there is no side abutment for position A, nor is there a front abutment for position H. The relationship of these abutments to the respective positions as determined by the notches will be clear from Fig. 9, wherein it is shown that the front abutment for position A appears at A' and the proximate side abutment appears at B". The same is true down the line, with the exceptions noted. The purpose of the front abutments A', B', etc. is to prevent the latch 108, even when disengaged from the associated notch, from running forwardly. Hence, the abutment thus provided is a one-way stop permitting rearward movement when the latch is disengaged but preventing forward movement unless the latch is laterally shifted to a new position to engage a notch forwardly of the present notch. The purpose of the side abutments B", C", etc. is to prevent lateral shifting of the latch in such direction as to select a notch rearwardly of the present notch unless the seat is first moved rearwardly. As a practical matter, it is preferable that lateral selection be achieved while the seat is in its extreme rear position, in which position the latch 108 is completely clear of the means 136 (Fig.

1), which is brought about by the angular relationship between the top portions 24 and 26. In order that the one-way engageability of the abutments A', B', etc. may be effectuated, the upward travel of the latch 110 is limited, as previously stated, by the rear cross bar 104. This is illustrated in broken lines in Fig. 4, wherein it will be seen that although the tongue 110 will clear the notch or aperture, it will not clear the associated abutment means. It will also be clear from Fig. 4 that in the event that the latch is raised while the seat is in the forward position indicated, further forward travel of the seat is prevented by engagement of the rear roller 32 by a stop at the proximate end of the channel 58, which stop is designated generally by the numeral 140.

The plate 138 may be welded to the top 24 of the seat support.

As shown in Fig. 5, the feature of supporting the selector means 84 on the shaft 62 which also combines support of the torsion means 60, is achieved by notching the selector means at 142 to accommodate the torsion means.

Operation

As best seen in Fig. 6, the latch 108 is in its extreme leftward position and is engaged with the aperture at position H so that the seat is in its extreme forward position. The angle of the selector lever 118 indicates that the front or indicating end thereof would be in the "Short" part of the selector slot 122. Since the dimple or detent 130 on the selector 118 engages the appropriate notch 128 in the aperture or selector slot, the structure affords means whereby the position of the latch 108 is releasably retained and will not be disturbed unless the selector lever 118 is moved laterally about its pivot 120. The rear extension 132 of the selector lever performs the function of biasing means for resiliently maintaining engagement of the latch 108 with the notch at position H.

As will be seen, the width of the rear portion of the selector means 84 is relatively wide so that as the latch 108 moves laterally back and forth across the shaft 106, the notch or recess 114 therein slides along the rear portion of the selector means. Because of the relationship just noted, the latch remains under control of the release selector means 84, so that if the operator desires that the seat move to its rear position, he lifts the selector 84 and stands, whereupon the seat, freed of his weight, will move to its extreme rear position under action of the torsion means 60. During this movement, the lateral position of the latch 108 remains as selected, so that when the operator seats himself again on the seat, his weight overcomes the torsion means 60 and the seat moves forwardly with the operator thereon, stopping again at position H. The seat will stop at this position even though the operator maintains an upward pressure on the selector 84, because the extreme forward position of seat will ultimately be determined by the engagement between the rear stop 140 with the rear roller 32. If the latch were in position G, there would be no forward overrun even though the latch were held in its raised position, because, as previously indicated, the cross bar 104 affords a stop limiting upward movement of the latch so that, although the latch tongue 110 can escape from the aperture or notch, it cannot pass the abutment as at G'.

As already suggested, it is preferred that lateral selection of the latch position be determined while the seat is in its extreme rear position, at which time the tongue of the latch is clear of the means 136 (Fig. 3). At this time, the latch is therefore free for lateral movement to any selected position in fore-and-aft alinement with the notch that it will ultimately engage upon forward movement of the seat. For example, if the selector 118 is turned completely to the left so that it is detented at the "Tall" position, the latch 108 will be positioned so that its tongue 110 is in fore-and-aft alinement with the notch at position A. Hence, when the operator is seated on the seat, it will move forwardly to position A and no further, even though the latch is held in its raised position, since, as already pointed out, the tongue of the latch cannot raise high enough to escape the abutment A'. Although lateral selection of the position of the latch 108 for engagement with a forwardly disposed notch, relative to a currently engaged notch, can be achieved without moving the seat completely to its extreme rear position, it will be found that selection under these circumstances is prohibited in one direction and can be achieved in the other direction only by precise manipulation of the selector while the seat is maintained in an intermediate position in which neither the weight of the operator nor the force of the torsion means creates a binding action on the tongue 110. For example, if the tongue is in the notch at position B, the latch can actually be moved over for registration with the notch at position C but it must be remembered that as soon as the latch tongue is released from the notch at position B, the biasing means 60 will tend to move the seat rearwardly, unless the operator retains a sufficient portion of his weight thereon to overcome the action of the biasing means. One the other hand, the amount of weight that the operator places on the seat will tend to bind the forward edge of the tongue against the forward edge of the notch, and if that occurs it will be difficult to release the latch.

One reason why it is preferred that latch selection be accomplished with the seat in its extreme rear position is that once the position of the latch is selected and retained by the detent means 128—130, the tongue of the latch will ride the imperforate portion of the top 24 until it encounters the position for which it is set. Hence, the operator knows that when he makes the selection with the seat in the rear position, it will automatically attain the desired position when he seats himself thereon.

The selective latching feature of the invention affords eight positions in one-inch increments in a commercially acceptable structure. The slope of the track means (here 25°) accommodates not only fore-and-aft positions but also differences in elevation to adapt the seat structure to operators through a considerable height range. The selector means 84 and 118 are readily operated independently, particularly since the selector means 84 depends for actuation upon vertical movement and the selector means 118 requires lateral movement. Hence, the operator cannot confuse the two and, since the two are independent, they are not likely to be operated simultaneously. In view of the virtual requirement that selection be made while the seat is in its extreme rear position, the simple stepped stop arrangement is possible, thus avoiding the possibility of jamming as would be likely with more complicated structures depending upon overriding components. The principal feature is of course the releasability of the seat from any selected position and the return thereof automatically to that selected position, which is achieved simply and without complicated controls.

Features of the invention not elaborated will readily occur to those versed in the art, as will many modifications and alterations in the preferred embodiment disclosed, all of which may be achieved without departure from the spirit and scope of the invention.

What is claimed is:

1. Seat structure, comprising: a fore-and-aft seat support having opposite fore-and-aft sides, front and rear ends and a top; a seat above said top; means mounting the seat on and for fore-and-aft movement relative to the support between extreme front and rear positions; a seat-carried latch biased vertically toward the top and selectively settable crosswise of the support in any selected one of a plurality of lateral positions relative to the width of said top; means on the top providing a plurality of upwardly opening notches arranged in a series diagonally across said top so that said notches are spaced apart fore-and-aft and are also offset laterally according to the lateral positions of the latch whereby the notch corresponding to the selected lateral position of the latch will receive the biased latch; first selector means for moving the latch out of engagement with a notch; and second selector means for setting the latch laterally while out of notch engagement.

2. The invention defined in claim 1, in which: the series of notches is so arranged that the rearwardmost notch is ahead of the extreme rear position so that the seat when the latch is released is capable of moving to said extreme rear position; and means biasing the seat to move to said extreme rear position when the latch is disengaged.

3. The invention defined in claim 2, in which: the means mounting the seat on the support includes provision for changing the elevation of the seat so that the extreme rear position of the seat is higher than the extreme forward position.

4. The invention defined in claim 1, including: a plurality of stops respectively at the front portions of the notches; and means limiting notch-disengaging movement of the latch to an amount clearing the latch from a notch but not from the stop for said notch whereby the seat is freed for rearward movement and is compelled to stop upon forward movement when the latch engages the selected stop unless said latch is set to a new lateral position while disengaged.

5. The invention defined in claim 4, in which: each notch has an additional side stop at one side thereof and said side stops are located respectively at corresponding sides of the notches; and said limiting means prevents the latch from clearing said side stops whereby the latch when disengaged from a selected notch can be set laterally in only one direction unless the seat is shifted rearwardly to clear the disengaged latch from the side stop for said selected notch.

6. A seat structure, comprising: a seat support; a seat above said support; means mounting the seat on the support for relative movement along a fore-and-aft path between front and rear positions; means on the support providing a plurality of stops progressively spaced apart both lengthwise of and transverse to said path; a latch carried by the seat for selective setting transversely to said path and into fore-and-aft alinement with a selected one of said stops and for movement selectively toward and away from engagement with the selected stop; means biasing the latch toward stop engagement so that a selected position of the seat is secured when the latch engages said selected stop; first selector means for moving the latch away from stop engagement while retaining the fore-and-aft alinement of said latch with the selected stop; and second selector means for selectively setting the latch, when out of stop engagement, into fore-and-aft alinement with another stop for achieving a new position of the seat.

7. Seat structure, comprising: a fore-and-aft seat support having opposite fore-and-aft sides, front and rear ends and a top, said top having a front portion inclining upwardly from said front end and an adjoining rear portion at a downward angle to said front portion; a seat above said top; means mounting the seat on the support for uphill and downhill movement along a path paralleling the front portion of said top between an extreme relatively low front position and an extreme relatively high rear position; a seat-carried latch biased vertically toward the front portion of the top and clearing the rear portion of said top when the seat is moved to its extreme rear position, said latch being selectively settable crosswise of the support in any selected one of a plurality of lateral positions relative to the width of the front portion of said top; means on said front portion of the top providing a plurality of upwardly opening notches arranged in a series diagonally across said front portion so that said notches are spaced apart fore-and-aft and are also offset laterally according to the lateral positions of the latch whereby the notch corresponding to the selected lateral position of the latch will receive the biased latch; first selector means for moving the latch out of engagement with a notch; and second selector means for setting the latch laterally while out of notch engagement.

8. Seat structure, comprising: a fore-and-aft seat support having opposite fore-and-aft sides, front and rear ends and a top; a seat above said top; means mounting the seat on and for fore-and-aft movement relative to the support between extreme front and rear positions; a transverse pivot element on the seat just above said top; a latch rockable on said pivot element toward and away from said top and selectively shiftable on said element for positioning in any selected one of a plurality of lateral positions relative to the width of said top; means on the top providing a plurality of upwardly opening notches arranged in a series diagonally across said top so that said notches are spaced apart fore-and-aft and are also offset laterally according to the lateral positions of the latch whereby the latch is registrable with a selected notch according to its lateral positions on said element; means biasing the latch into engagement with any selected notch; first selector means for rocking the latch out of engagement with a notch; and second selector means for setting the latch laterally while out of notch engagement.

9. The invention defined in claim 8, in which: the latch has a forward portion ahead of the pivot element provided with a forwardly opening recess; and the first selector means is a vertically rockable member carried by the seat and having a lateral width corresponding to the lateral shiftability of the latch and received by said recess whereby the latch may be shifted laterally while retaining receipt of the member in said recess.

10. The invention defined in claim 8, in which: the selector means is a laterally swingable lever mounted on the seat and having an arm portion engaging the latch; and the means biasing the latch is incorporated in said arm portion of the second selector means.

11. Seat structure, comprising: a support having a fore-and-aft top provided with opposite sides and front and rear ends, said top having a plurality of upwardly opening notches spaced apart both fore-and-aft and laterally to form a series diagonal to the fore-and-aft extent of said top; a seat above the support and having opposite side portions depending respectively past the opposite sides of said top and a front portion depending ahead of the front end of said top; means mounting the seat on the support for fore-and-aft movement relative to the support; a latch shaft extending transversely between and carried by the seat side portions; a latch carried by the shaft for transverse positioning thereon to aline the latch selectively with any one of said notches, said latch being rockable downwardly and upwardly on said shaft respectively for engagement with and disengagement from the selected notch; a rear cross member carried by the seat side portions rearwardly of the shaft and affording a limit on upward rocking of the latch; a front cross member carried by the seat side portions ahead of the shaft; a pivot member carried by the seat side portions ahead of the shaft; a first selector rockable on the pivot member and engaging the latch to effect disengagement of the latch, said selector projecting ahead of the seat front portion and said front portion being apertured to accommodate said selector; a second selector pivoted to the front cross member on a vertical pivot and having a rearward arm engaging the latch to effect lateral shifting of said latch upon swinging of said second selector and said second selector having a forward arm projecting ahead of the seat front portion for swinging said second selector, said seat front portion being apertured to accommodate said forward arm; means releasably retaining the second selector in various positions corresponding respectively to the lateral setting of the latch; and means biasing the latch downwardly toward engagement with a selected notch.

12. Seat structure, comprising: a support having a fore-and-aft top provided with opposite sides and front and rear ends, said top having a plurality of upwardly opening notches spaced apart both fore-and-aft and laterally to form a series diagonal to the fore-and-aft extent of said top; a seat above the support and having opposite side portions depending respectively past the opposite sides of said top; means mounting the seat on the support for fore-and-aft movement relative to the support; a latch shaft extending transversely between and carried by the seat side portions; a latch carried by the shaft for transverse positioning thereon to aline the latch selectively with any one of said notches, said latch being rockable downwardly and upwardly on said shaft respectively for engagement with and disengagement from the selected notch; a rear cross member carried by the seat side portions rearwardly of the shaft and affording a limit on upward rocking of the latch; a front cross member carried by the seat side portions ahead of the shaft; a pivot member carried by the seat side portions ahead of the shaft; a first selector rockable on the pivot member and engaging the latch to effect disengagement of the latch; a second selector pivoted to the front cross member on a vertical pivot to effect lateral shifting of said latch; means releasably retaining the second selector in various positions corresponding respectively to the lateral setting of the latch; and means biasing the latch downwardly toward engagement with a selected notch.

13. The invention defined in claim 12, including: means biasing the seat to move rearwardly when the latch is disengaged, including a torsion spring device carried by the front pivot member.

14. In a seat structure having a support element and a seat element mounted on and for fore-and-aft movement relative to the support element, the improvement residing in means for biasing the seat element in one direction, comprising: a shaft having outer and inner ends and formed with an axially extending diametrical slot opening axially at said outer end; means mounting the shaft on one element for rotation and against axial displacement, said mounting means including an element-connected member having an aperture receiving said outer end of the shaft and said member having notch means radial to said aperture; torsion spring means keyed to and wound on the shaft inwardly of said member and connected to the other element; a key axially slidably received in the shaft slot and having an outward position accessible through the outer end of said slot, said key having a lug engageable in said outward position with said notch means; and means biasing the key to said outward position and yielding to axially inward pressure to enable release of the key lug from the notch means so that the shaft may be turned to vary the torsion of the torsion spring means.

15. In a seat structure having a support element and a seat element mounted on and for fore-and-aft movement relative to the support element, the improvement residing in means for biasing the seat element in one direction, comprising: a shaft having outer and inner ends and formed with an axially extending diametrical slot opening axially at said outer end; means mounting the shaft on one element for rotation and including an element-connected member having an aperture receiving said outer end of the shaft and said member having notch means radial to said aperture; torsion spring means on the shaft and spaced inwardly of said member, said means having a connection to the other element and including a spring portion received in the inner end of the shaft slot and serving to prevent axial inward displacement of the spring portion relative to the shaft; a hub member on the shaft between the member and the spring portion and abutting the latter; a coil spring encircling the shaft intermediate the member and the hub and biasing the shaft inwardly via said hub, spring portion and inner end of the slot; means limiting inward axial displacement of the shaft; a key axially slidably received in the shaft slot and having an outward position accessible through the outer end of said slot, said key having a lug engageable in said outward position with said notch means and said key being engaged by the coil spring to be biased to said outward position; and said limit means having a portion engaging the key to prevent ejection thereof from the slot by said coil spring.

16. Seat structure, comprising: a support provided with upper fore-and-aft track means having front and rear ends and including a pair of laterally spaced apart fore-and-aft track elements; a seat carried by the track means for fore-and-aft movement relative to the support; upwardly facing means on the support between the track elements and affording a series of stops arranged diagonally to the path of fore-and-aft movement of the seat; a seat-carried latch interposed between said upwardly facing means and the underside of the seat and selectively settable laterally relative to the seat and relative to said upwardly facing means for engagement with any one of said stops according to the lateral setting of said latch; means including a forward portion on the seat depending ahead of the front end of the support; first selector means on said portion for disengaging the latch from any notch while retaining the lateral setting of the latch; and second selector means on said portion for setting the latch laterally while disengaged.

17. Seat structure, comprising: a fore-and-aft support element; a seat element; means carried by the support element and mounting and guiding the seat element for movement relative to said support element along a fore-and-aft path; latch means carried by one element and biased toward the other element and selectively settable crosswise of said path in any selected one of a plurality of lateral positions; means on the other element providing a series of notches opening toward the latch means and arranged in a series diagonal to said path so that said notches are spaced apart fore-and-aft as well as being offset crosswise of said path whereby the notch corresponding to the selected lateral position of the latch means will normally receive the biased latch means; first selector means for moving the latch means out of engagement with a notch; and second selector means for setting the latch means laterally while out of notch engagement.

18. Seat structure, comprising: a fore-and-aft support element; a seat element; means carried by the support element and mounting and guiding the seat element for movement relative to said support element along a fore-and-aft path between extreme front and rear positions; and selectively operative means for interrupting forward movement of the seat element from its extreme rear position to any selected intermediate position, said selectively operative means including a series of stops on one element arranged diagonally to said path so that said stops are spaced apart fore-and-aft as well as being offset crosswise of said path, a latch on the other element biased toward engagement with said series and settable crosswise of said path for fore-and-aft alinement with a selected one of the stops so as to engage only said one selected stop upon forward movement of said seat element, means for disengaging the latch from said selected stop, and means for setting the disengaged stop crosswise of said path.

19. The invention defined in claim 18, including: means operative to prevent lateral setting of the latch in at least one direction except when the seat element is at its extreme rear position.

References Cited in the file of this patent

UNITED STATES PATENTS

| | | |
|---|---|---|
| 1,821,247 | Thomas | Sept. 1, 1931 |
| 2,174,732 | Carnes et al. | Oct. 3, 1937 |
| 2,240,143 | Lustig | Apr. 29, 1941 |